United States Patent
Miura (10) Patent No.: US 7,293,410 B2
(45) Date of Patent: Nov. 13, 2007

(54) INTERNAL COMBUSTION ENGINE HAVING AN EXHAUST PARTICULATE FILTER

(75) Inventor: Manabu Miura, Zushi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 11/304,069

(22) Filed: Dec. 15, 2005

(65) Prior Publication Data

US 2006/0144038 A1  Jul. 6, 2006

(30) Foreign Application Priority Data

Dec. 16, 2004  (JP) .............................. 2004-364479

(51) Int. Cl.
*F01N 3/00* (2006.01)

(52) U.S. Cl. ............................ 60/295; 60/274; 60/285; 60/297; 60/311

(58) Field of Classification Search .................. 60/274, 60/276, 285, 295, 297, 311
See application file for complete search history.

(56) References Cited

U.S. PATENT DOCUMENTS

| | | |
|---|---|---|
| 6,574,956 B1 | 6/2003 | Moraal et al. |
| 6,851,258 B2 | 2/2005 | Kawashima et al. |
| 6,915,629 B2 * | 7/2005 | Szymkowicz ................. 60/289 |
| 6,969,413 B2 * | 11/2005 | Yahata et al. ............... 55/282.3 |
| 6,988,361 B2 * | 1/2006 | van Nieuwstadt et al. .... 60/295 |
| 2004/0194450 A1 * | 10/2004 | Tanaka et al. ................ 60/285 |

FOREIGN PATENT DOCUMENTS

| | | |
|---|---|---|
| EP | 1 536 120 A2 | 6/2005 |
| FR | 2 830 274 A1 | 4/2003 |
| JP | 2002-089327 | 3/2002 |
| JP | 2003-193310 | 7/2003 |

* cited by examiner

*Primary Examiner*—Thomas Denion
*Assistant Examiner*—Diem Tran
(74) *Attorney, Agent, or Firm*—Young Basile; Hanlon MacFarlane & Helmholdt, P.C.

(57) ABSTRACT

A control unit prevents overheating of a particulate filter in an exhaust path of an internal combustion engine during regeneration of the particulate filter if the regeneration deviates from prescribed conditions. Overheating is prevented using one of two engine operations: a first operation with a relatively lower exhaust temperature and relatively higher oxygen surplus (lean operation), or a second operation with a relatively higher exhaust temperature and a relatively lower oxygen surplus (rich operation). Based on the filter temperature and amount of particulate sediment, a heating value in the particulate filter (the heat quantity of an oxidation reaction of burning particulates in the particulate filter) is calculated for each operation. The operation with a lower heat budget, i.e., the difference between the heating value and heat released, is selected to cool the filter.

19 Claims, 4 Drawing Sheets

INTERNAL COMBUSTION ENGINE HAVING AN EXHAUST PARTICULATE FILTER

This application claims priority from Japanese Patent Application Serial No. 2004-364479, filed Dec. 16, 2004, the entire contents of which is incorporated herein by reference.

TECHNICAL FIELD

The invention relates to an internal combustion engine having an exhaust particulate filter.

BACKGROUND

Some internal combustion systems include a particulate capturing filter placed in the exhaust path. Such systems may regenerate the particulate capturing filter by raising the filter temperature under an engine operation that creates prescribed regeneration conditions in a prescribed regeneration time to burn the particulate sediment in the filter.

SUMMARY

Conditions in an exhaust particulate filter may deviate from prescribed regeneration conditions when engine driving mode changes from high-load drive to low-load drive during regeneration. Low load drive reduces oxygen within the exhaust, which prevents burning the particulates. However, depending on filter conditions, by returning the engine to normal combustion, particulate sediments captured in the filter may immediately burn out under excess oxygen conditions, which can cause overheating of the filter. On the other hand, if there are no particulate sediments, there is no danger of overheating when the engine is returned to a lean combustion.

One aspect of the inventive method may reduce exhaust particulate filter overheating potentially created if engine operating conditions deviate from regeneration conditions during the regeneration process. One of the two engine operations may be selected: (1) a first engine operation with high heat release from the filter, and (2) a second engine operation to limit particulate oxidation to reduce heating from combustion of particulate sediments in the filter. The operation selected cools the particulate filter, and also depends on the filter conditions after deviation from the prescribed regeneration conditions.

The regeneration conditions may also be adjusted depending on filter conditions. In one instance the filter is controlled to further reduce its temperature either by enhancing heat released from the filter (the quantity of the negative heat transfer between the filter and exhaust emission), or by reducing heat created by an oxidation reaction of burning particulate accumulating in the filter based on the temperature of the filter and the amount of particulate sediment in the filter.

In one embodiment, a system comprises a filter in an exhaust path of an internal combustion engine that captures particulates from exhaust in the exhaust path and a control unit that determines when regeneration conditions deviate from prescribed regeneration conditions during regeneration of the filter. Based on the determination, the control unit selects one of a first engine operation that increases heat transfer from the filter to the exhaust, and a second engine operation that limits particulate combustion in the filter.

In another embodiment, a method comprises determining whether regeneration conditions deviate from prescribed regeneration conditions during regeneration of an exhaust particulate filter. The method further comprises selecting, in response to the determination, one of a first engine operation that increases heat transfer from the filter to exhaust passing through the filter and a second engine operation that limits particulate combustion in the filter.

In another embodiment, a system comprises means for determining when regeneration conditions deviate from prescribed regeneration conditions during regeneration of an exhaust particulate filter. The system further comprises means for selecting one of a first engine operation that increases heat transfer from the filter to exhaust passing through the filter and a second engine operation that limits particulate combustion in the filter.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
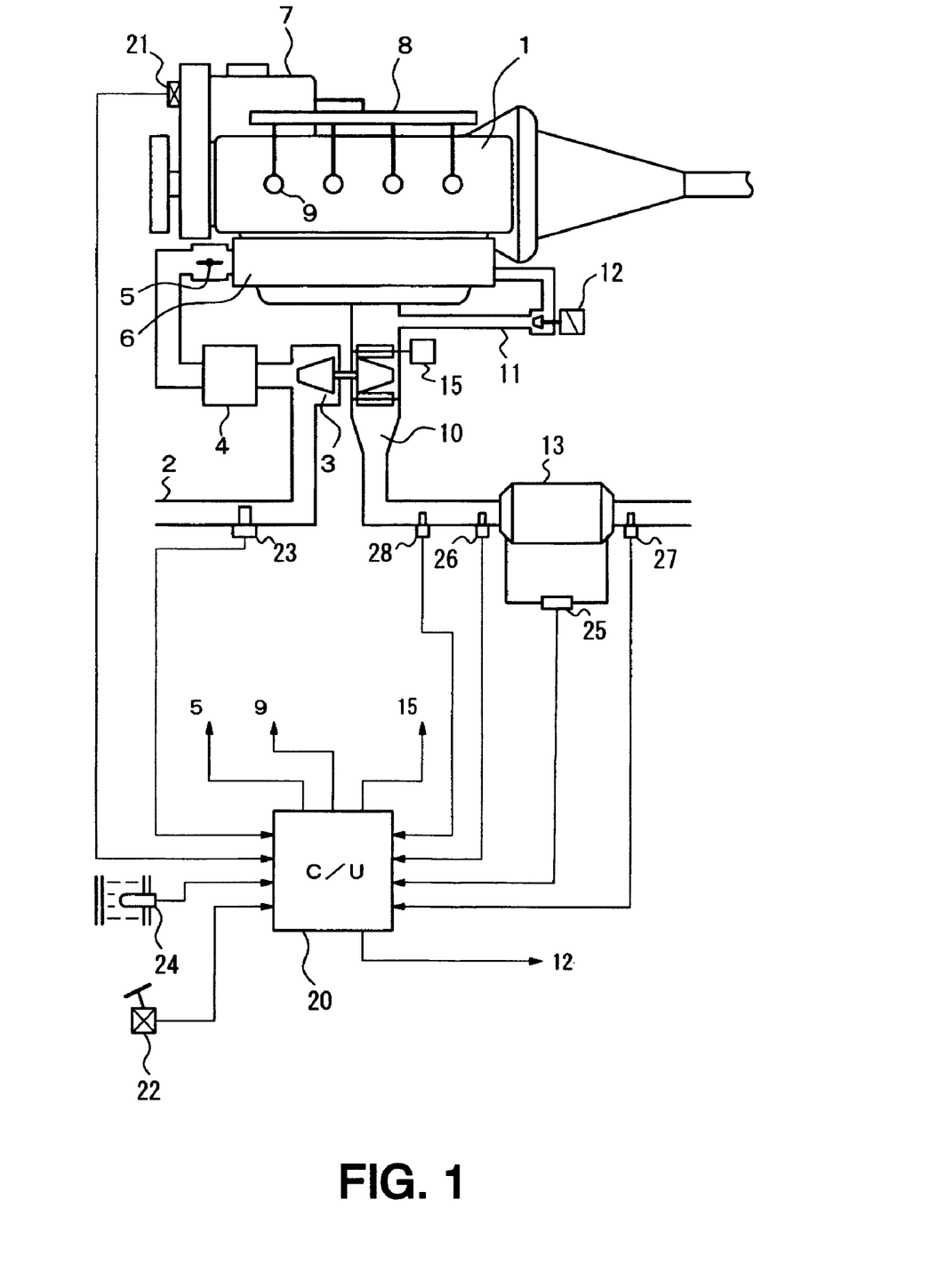
FIG. 1 is a schematic diagram illustrating an engine showing one embodiment of the invention.

FIG. 1 is a schematic diagram illustrating an engine 1, e.g., a diesel engine, showing one embodiment of the invention. An inlet compressor of a variable-nozzle supercharger 3, e.g., a turbocharger, is provided in an intake air passage 2 of the diesel engine 1. Intake air is supercharged by the inlet compressor and cooled in an intercooler 4, and enters into a combustion chamber of each cylinder after passing through an inlet air throttle 5 and a collector 6. The intake air amount passing through the intake air passage 2 is controlled by the open degree of the inlet air throttle 5 provided in the path of the intake air passage 2.

Fuel is forwarded to a common rail 8 under high pressure by a high-pressure fuel pump 7 directly sprayed from a fuel injection valve 9 of each cylinder into the combustion chamber. The air entering the combustion chamber and the fuel sprayed into the combustion chamber are burned in the combustion chamber by compression ignition and exhaust outflows through an exhaust path 10.

Part of the exhaust in the exhaust path 10 is refluxed to the inlet side in an exhaust recirculation (hereinafter referred to as "EGR") passage 11 via an EGR valve 12 as EGR gas by an EGR system. The remaining exhaust passes through an exhaust turbine of a variable-nozzle supercharger 3 to drive the turbine.

A diesel particulate filter (hereinafter referred to as "DPF") 13 is provided downstream of the turbine in the exhaust path 10 to capture particulate exhausted in the exhaust.

Control unit 20 receives inputs from a variety of components to control engine 1. For example, engine-speed sensor 21 detects engine rotations Ne, accelerator position sensor 22 detects accelerator position APO, air flow meter 23 detects the amount of the intake air Qa, and water temperature sensor 24 detects the engine coolant temperature Tw.

To detect pressure loss in the DPF 13, a differential pressure sensor 25 detects the differential pressure ΔP in DFP 13, exhaust temperature sensors 26, 27 detect the exhaust temperature Tin, Tout on both the inlet and outlet sides of the DPF 13, and an air/fuel ratio sensor (O2 sensor) 28 detects the air/fuel ratio (oxygen concentration) of the exhaust emission entering the DPF 13. Each of these signals is an input for the control unit 20.

Based on these input signals, the control unit 20 outputs: a command signal for fuel injection into the fuel injection valve 9 to control the fuel injection amount and fuel injection timing with the fuel injection valve 9, a command signal for opening into the inlet air throttle 5, a command signal for opening into the EGR valve 12, and a command signal for nozzle-opening into a variable-nozzle mechanism 15 of the supercharger 3.

If the amount of particulate sediment captured in the DPF 13 increases, driving performance becomes worse due to increased exhaust pressure. Control module 20 initiates regeneration based on an estimated amount of particulate sediment in the DPF 13. Detailed descriptions of the relevant DPF regeneration control are given below.

Figure 2:
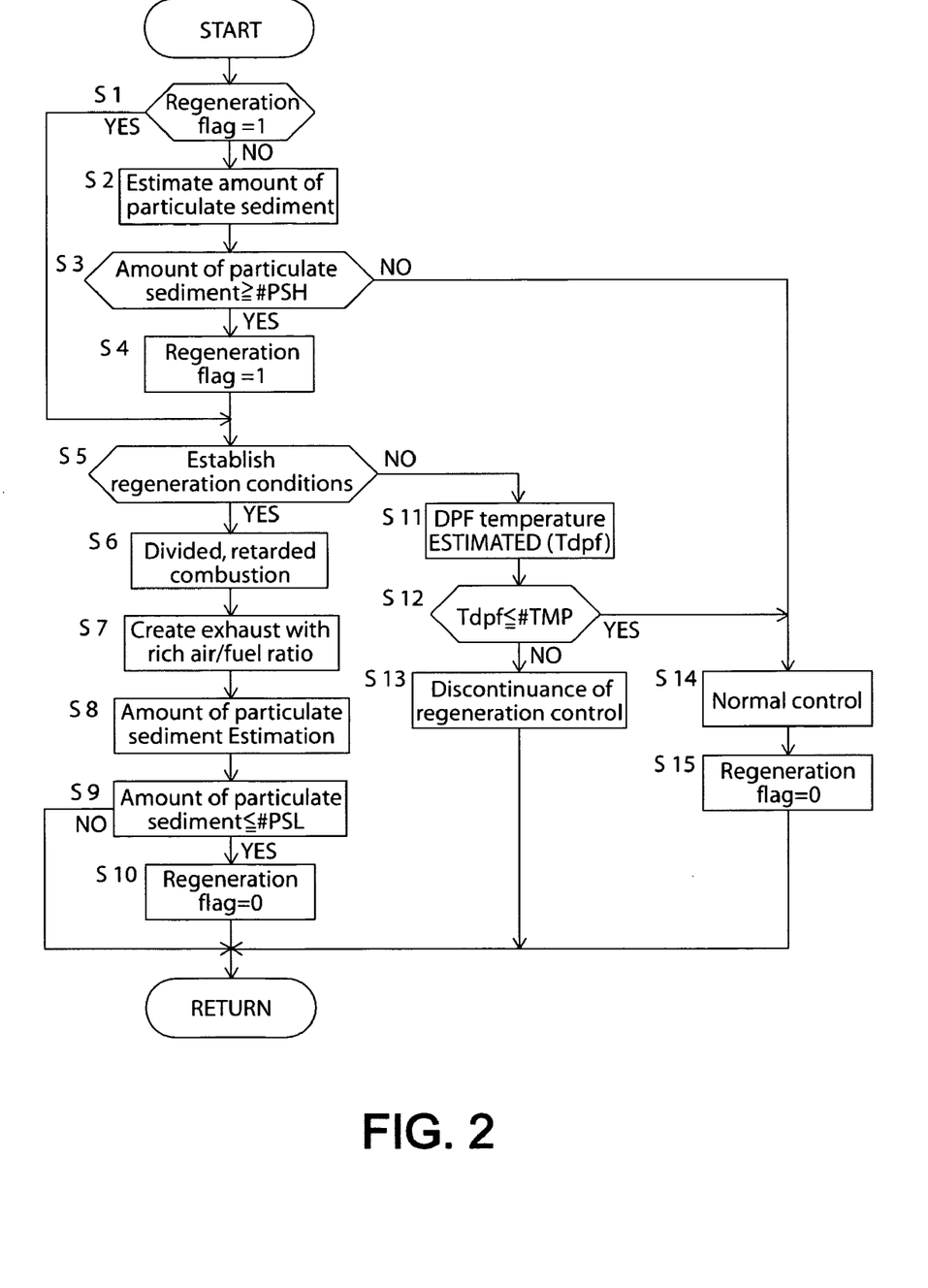
FIG. 2 is a flowchart for a main routine of diesel particulate filter regeneration control.

FIG. 2 is a flowchart illustrating DPF regeneration control by the control unit 20, which may be repeatedly exercised at a predetermined time.

In step S1, controller 20 determines a value of the regeneration flag, and if the value is 0 (nonregenerative), the controller estimates the particulate sediment in the DPF 13 (C) in step S2.

For example, controller 20 may detect the differential pressure in the DPF 13 ΔP by reading signals from the differential pressure sensor 25. Controller 20 estimates a flow rate of exhaust emission SV by referring to a known function based on the amount of the intake air Qa detected by the air flow meter 23 and the reading of the injection quantity Qf to a fuel injection valve 9. Controller 20 estimates particulate sediment in the DPF 13 based on the differential pressure ΔP in the DPF and the flow rate of exhaust emission SV. The more the differential pressure in the DPF increases, the larger the estimated amount of particulate sediment becomes because as the amount of particulate sediment captured in the DPF 13 increases. However, the differential pressure in the DPF varies according to the flow rate of exhaust emission. If the amount of particulate sediment is the same, the more the flow rate of exhaust emission increases, the more the differential pressure in the DPF increases. Controller 20 corrects the estimated amount of particulate sediment based on the flow rate of exhaust emission.

In S3, controller 20 compares the amount of particulate sediment estimated in S2 with the prescribed "particulate sediment high" value (hereinafter referred to as "#PSH") to determine whether or not the estimated amount of particulate sediment is greater than or equal to #PSH.

In the case of the estimated amount of particulate sediment <#PSH, controller 20 determines regeneration is not currently required, thereafter S14 is followed to perform a normal control (normal lean combustion in a diesel engine).

If the estimated amount of particulate sediment ≧#PSH, controller 20 determines that regeneration is required. Thereafter, S4 is followed.

In S4, controller 20 sets the regeneration flag to 1, thereafter S5 is followed. If the regeneration flag is also determined to be 1 (during regeneration) in S1, thereafter S5 is followed.

In S5, it is determined whether or not the regeneration conditions are established. Controller 20 determines whether or not the operating conditions meet the regeneration conditions: if the engine driving mode is in idle drive, slow-speed drive, or ultra-low-speed drive (for example, less than 20 km/h), controller 20 determines that the regeneration conditions are not established, thereafter S11 is followed. In other engine driving modes, controller 20 determines that the regeneration conditions are established; thereafter S6 and S7 are followed to regenerate the DPF 13.

In S6, to complete regeneration of the DPF 13, controller 20 determines changes combustion from a normal lean combustion in a diesel engine to a divided, retarded combustion. The divided, retarded combustion includes a main or primary combustion to generate engine torque and at least one preliminary combustion prior to the main combustion. At least one of the preliminary combustions requires fuel injection to occur on the compression stroke. The main combustion requires fuel injection to start after the preliminary combustion is completed.

In S7, the controller 20 sets the air/fuel ratio (the value is represented as "λ") to be comparatively rich (for example, λ=0.9 to 1.4) to control. When regenerating the DPF, the exhaust λ needs to be controlled from 0.9 to 1.4, and the temperature of the DPF needs to be raised to over 600 degrees Celsius. To control the exhaust λ between 0.9 and 1.4, the controller 20 controls the fuel injection amount and the air throttle 5 to adjust the air amount taken in the combustion chamber.

Figure 4:
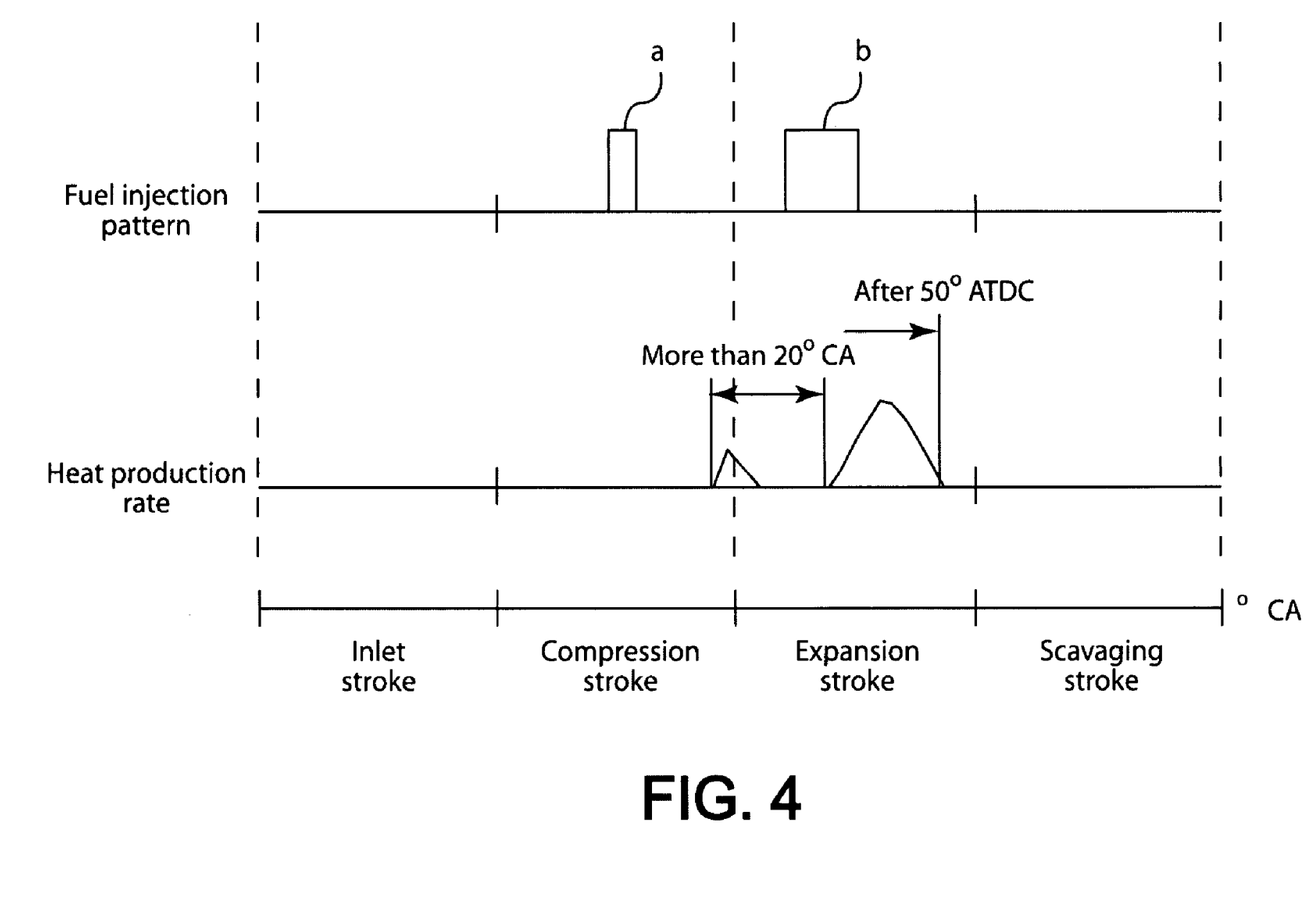
FIG. 4 is a chart showing a combustion model of a divided, retarded combustion.

As shown in FIG. 4, controller 20 implements fuel injection (a,b) for the divided, retarded combustion to promote a main combustion to generate the main torque, and a preliminary combustion prior to the main combustion by dividing the main injection. The preliminary combustion occurs close to top dead center (hereinafter referred to as "TDC"), and the main combustion starts after the preliminary combustion is completed.

First, fuel is injected on the compression stroke (a), which creates a preliminary combustion to raise the cylinder temperature (temperature of the pressure connector) close to TDC. The injection quantity to generate heat in the preliminary combustion depends on the operating conditions. Thereafter, the fuel injected during preliminary combustion maintains a cylinder temperature that exceeds the temperature at which autoignition can happen during fuel injection for the main combustion. The stability of the preliminary combustion can be improved by changing the fuel injection quantity and timing for the preliminary combustion depending on the temperature of the pressure connector estimated under each operating condition.

Subsequently, after the preliminary combustion is completed, the fuel for the main combustion is injected after TDC at (b).

While improving the controllability for the target temperature with expanding the retard limitations by raising the cylinder temperature with the preliminary combustion, controller 20 also controls smoke emission with the ignition delay time for the mail controller 20, and raises the premix combustion ratio of the main combustion by injecting the fuel for the main combustion after the entire preliminary combustion is completed.

The interval between the commencing time of the preliminary combustion and that of the main combustion depends on the engine rotations. The interval may be at least 20° crank angle (CA) for the preliminary combustion (heat generation caused by the preliminary combustion) to be completed. With such setup of the interval, smoke deterioration can be prevented by preventing the main combustion from deteriorating. The combustion speed is extremely slow because the main combustion starts during the expansion stroke, and the main combustion is completed after 50° after TDC.

Delaying the termination time of the main combustion makes the main combustion slower, which may prevent increased combustion noise.

Such divided, retarded combustion can occur at high emission temperatures and with low smoke under rich conditions, and where hydrocarbon emissions are low. The combustion under low λ conditions becomes stable, and high exhaust temperature can be secured even if the injection timing of the main injection is retarded because the retard limitations of the main combustion are expanded by the preliminary combustion.

When the load on the engine is low, the high cylinder temperature at the injection timing of the main injection requires more than one time preliminary combustion because the combustion timing of the main combustion to achieve the target exhaust temperature greatly retards. In that case, controller 20 can achieve low smoke and high exhaust temperature with a plurality of preliminary combustions even under low load conditions.

Returning now to FIG. 2, during regeneration of the DPF 13 in S6,S7, particulate sediment in the DPF 13 (C) is estimated in S8 just as in S2.

In S9, controller 20 compares the amount of particulate sediment estimated in S8 with the prescribed "particulate sediment low" value (hereinafter referred to as "#PSL") to determine the completion of regeneration to determine whether or not the estimated amount of particulate sediment ≦#PSL.

In the case of the estimated amount of particulate sediment >#PSL, controller 20 determines regeneration is not complete, and regeneration continues.

In the case of the estimated amount of particulate sediment ≦#PSL, controller 20 implements regeneration, thereafter S10 is followed to return by resetting the regeneration flag to 0.

On the other hand, if the exhaust particulate filter deviates from the regeneration conditions during regeneration, to be more precise, if the engine driving mode changes to idle drive, S11 follows S5 to stop regeneration.

Temperature Tdpf of the DPF 13 is estimated in S11. Exhaust temperature Tin on the inlet side and exhaust temperature Tout on the outlet side of the DPF 13 are detected by signals from the exhaust temperature sensors 26,27 for DPF temperature Tdpf to be estimated. To be more precise, Tdpf is estimated using the following equation, with 0<k<1:

$$Tdpf = k * Tin + (1-k) * Tout \quad \text{(Equation 1)}.$$

In S12, controller 20 determines whether or not DPF temperature Tdpf is lower than the prescribed temperature #TMP. This occurs where the temperature of the DPF 13 is lowered enough when regeneration of the DPF 13 has not been commenced, or by discontinuance of regeneration control.

In the case of DPF temperature Tdpf≦#TMP, there are no problems with changing to normal lean combustion in the diesel engine. Therefore, S14 is followed to change to normal control (normal lean combustion in the diesel engine). At this time, the regeneration flag is reset to 0 in S15.

Figure 3:
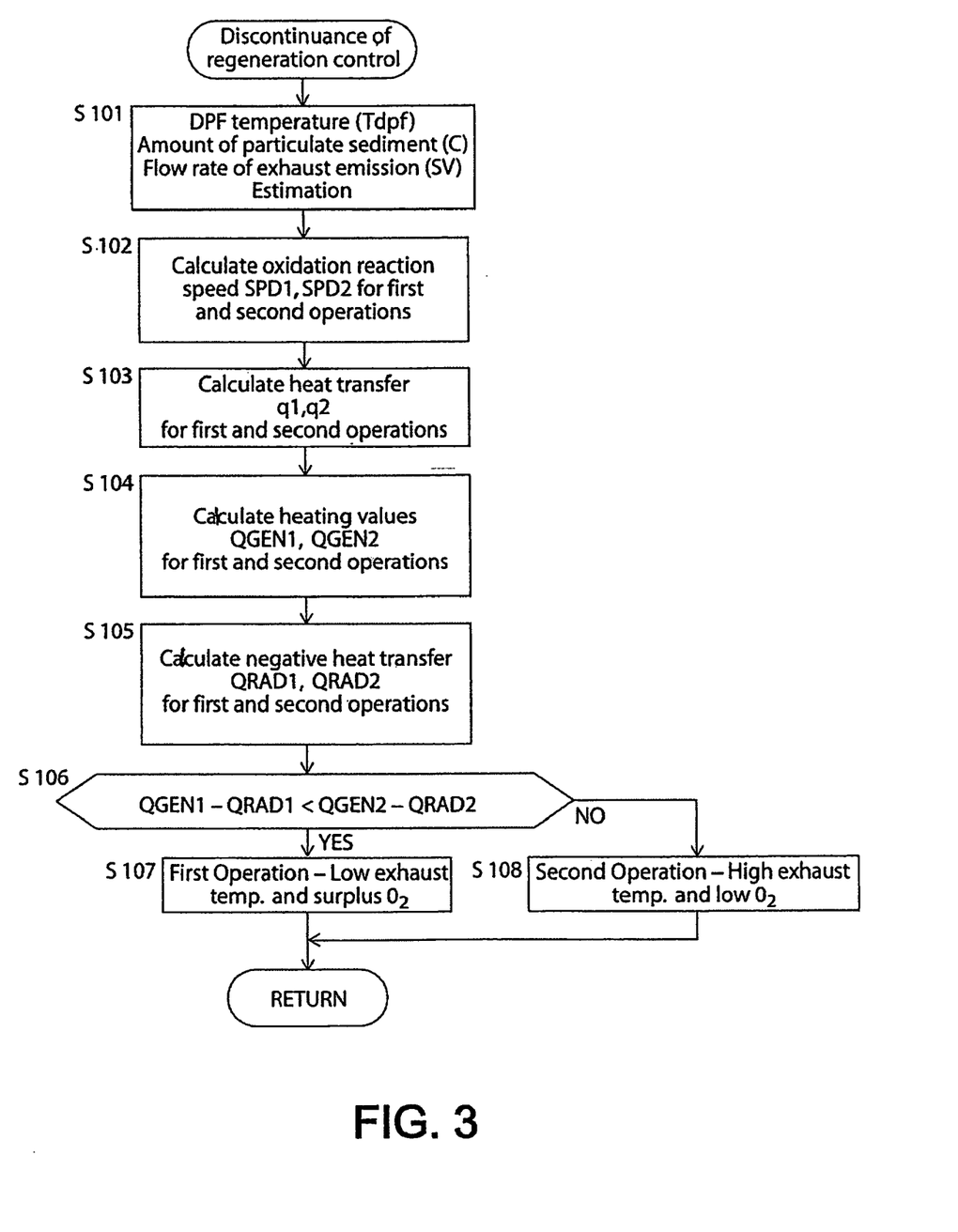
FIG. 3 is a flowchart for a subroutine of discontinuance of regeneration control.

In the case of DPF temperature Tdpf>#TMP, thereafter S13 is followed to execute the discontinuance of regeneration control (sub routine in FIG. 3).

FIG. 3 is a flowchart for a subroutine of the discontinuance of regeneration control to be executed in S13 of the process in FIG. 2. In the flowchart, one of two engine operations is selected depending on the conditions of the DPF 13.

The first engine operation is an operation with higher heat released from the DPF 13 (quantity of the negative heat transfer between the DPF 13 and exhaust emission) than the second engine operation, in other words, the exhaust temperature entering the filter is so low that there is a high oxygen surplus, to put it simply, it is a lean operation. Of the first engine operation (lean operation), the DPF 13 is cooled by the exhaust emission so that the heat released from the DPF 13 will be higher because the temperature of the exhaust emission is low. However, the heating value in the DPF 13 (heat quantity by an oxidation reaction arising from burning particulate accumulating in the DPF 13) may be higher than the heat released because of an oxygen surplus depending on the conditions of the DPF 13.

The second engine operation is an operation with lower heating value in the DPF 13 (heat quantity by an oxidation reaction arising from burning particulate accumulating in the DPF 13) than the first engine operation, in other words, the exhaust temperature entering the filter is so high that there is a low oxygen surplus, to put it simply, it is a rich operation. Of the second engine operation (rich operation), the heating value in the DPF 13 becomes low because there is a low oxygen surplus. However, the heat released from the DPF 13 (quantity of the negative heat transfer between the DPF 13 and exhaust emission) may be lower than the heating value depending on the conditions of the DPF 13 because the exhaust temperature is high.

In comparison with the divided, retarded combustion under low λ conditions used for regeneration, the first and second engine operations have normal injection timing (close to TDC) in the diesel engine without dividing the main injection, and retarding the injection timing. As discussed with respect to FIG. 2, normal operation of the engine 1 uses a lean air/fuel ratio, while regeneration of the DPF 13 requires a much richer air/fuel ratio. The first and second engine operations require air/fuel ratios within the range of an air/fuel ratio for normal operation and an air/fuel for regeneration of the DPF 13. Specifically, the first engine operation uses an air/fuel ratio as rich or richer than the normal lean combustion in the diesel engine, but leaner than the divided, retarded combustion during regeneration. The second engine operation also uses an air/fuel ratio as lean as, or leaner than the divided, retarded combustion during regeneration, but richer than the first engine operation and normal lean combustion.

Temperature Tdpf of the DPF 13 is estimated in S101 just as in S11. Particulate sediment C in the DPF 13 is also estimated just as in S2,S8. The flow rate of exhaust emission SV is estimated by the amount of the intake air Qa detected by the air flow meter 23 and the reading of the injection quantity Qf to an fuel injection valve 9.

In S102, forecasting calculations of the oxidation reaction speed (combustion speed) SPD1,SPD2 arising from burning particulate accumulating in the DPF 13 are performed of the first engine operation (lean operation), or the second engine operation (rich operation).

The oxidation reaction speed SPD is estimated using the following equation:

$$SPD = k * e^{(-Ea/R/Tdpf)} * C * O \quad \text{(Equation 2)}$$

In equation 2, k is the reaction rate constant, Ea is the activation energy constant, R is the gas constant, Tdpf is the DPF temperature, C is the amount of particulate sediment and O is the oxygen concentration of the exhaust emission entering the DPF.

The oxidation reaction speed SPD can be estimated using the following equation as functions of DPF temperature Tdpf, amount of particulate sediment C and oxygen concentration O because k, Ea and R are constant:

$$SPD = f(Tdpf, C, O) \quad \text{(Equation 3)}$$

The oxidation reaction speed SPD1=f (Tdpf, C, O1) of the first engine operation is estimated assigning the current DPF temperature Tdpf, the current amount of particulate sediment, and the oxygen concentration (predicted value) O=O1 of the first engine operation to the above Equation 3.

The oxidation reaction speed SPD2=f (Tdpf, C, O2) of the second engine operation is estimated assigning the current DPF temperature Tdpf, the current amount of particulate sediment, and the oxygen concentration (predicted value) O=O2 of the second engine operation to the above Equation 3.

In S103, forecasting calculations of the velocity of the negative heat transfer between the DPF 13 and exhaust emission q1,q2 are performed of the first engine operation (lean operation), or the second engine operation (rich operation).

The velocity of the negative heat transfer between the DPF 13 and exhaust emission is estimated using the following equation, with a the heat transfer coefficient, Tdpf the DPF temperature, Tgas the temperature of the exhaust emission entering the DPF, SV the flow rate of exhaust emission, and A the effective superficial area of DPF:

$$q = \alpha * (Tdpf - Tgas) * SV * A \quad \text{(Equation 4)}$$

The velocity of the heat transfer q can be estimated using the following equation as functions of DPF temperature Tdpf, temperature of the exhaust emission, and flow rate of exhaust emission SV because $\alpha$ and A are constant:

$$q = f(Tdpf, Tgas, SV) \quad \text{(Equation 5)}$$

Therefore, the velocity of the heat transfer q1=f(Tdpf, Tgas 1, SV) of the first engine operation is estimated with the current DPF temperature Tdpf, the current temperature of the exhaust emission (predicted value) T gas=T gas 1 in the case of the first engine operation, and the current flow rate of exhaust emission SV in the above Equation 5.

Also, the quantity of the heat transfer q2=f (Tdpf, Tgas 2, SV) of the second engine operation is estimated with the current DPF temperature Tdpf, the current temperature of the exhaust emission (predicted value) T gas=T gas 2 in the case of the second engine operation, and the current flow rate of exhaust emission SV in the above Equation 5.

Integration of the oxidation reaction speed SPD1, SPD2 in the case of the first and second engine operations estimated in S102, heat quantities by oxidation reactions (heating values) QGEN1, QGEN2 in the case of the first and second engine operations are estimated in S104:

$$QGEN1 = \Sigma(SPD1) \quad \text{(Equation 6)}$$

$$QGEN2 = \Sigma(SPD2) \quad \text{(Equation 7)}$$

Integration of the velocity of the negative heat transfer between the DPF 13 and exhaust emission q1,q2 in the case of the first and second engine operations estimated in S103, quantities of the negative heat transfer (heat released) QRAD1, QRAD2 in the case of the first and second engine operations are estimated in S105:

$$QRAD1 = \Sigma(q1) \quad \text{(Equation 8)}$$

$$QRAD2 = \Sigma(q2) \quad \text{(Equation 9)}$$

In S106, a heat budget of the first engine operation (the difference between the heating value QGEN1 and the heat released QRAD 1), equal to QGEN1-QRAD1, is estimated; and a heat budget in the case of the second engine operation, equal to QGEN2-QRAD2, is estimated. These heat budgets will show the trend of rising temperature in the case of each operation. If the heat budget is positive, the temperature of the DPF 13 will rise; and if it is negative, the temperature of the DPF 13 will fall.

It is determined whether or not QGEN1-QRAD1<QGEN2-QRAD2 in S106: if YES, the heat budget of the first engine operation means the temperature of the DPF 13 will fall, thereafter, S107 is followed to select the first engine operation (lean operation).

If NO is the determination is S106, it will be QGEN1-QRAD1≦QGEN2-QRAD2, the heat budget of the second engine operation means the temperature of DPF 13 will fall. Thereafter, S108 is followed to select the second engine operation (rich operation).

As described above, according to the embodiments, if the DPF 13 deviates from the regeneration conditions during regeneration, the DPF 13 can be controlled toward the direction where the temperature of the DPF 13 will further fall so that overheating of the filter can be avoided, by selecting either one of the two engine operations between the first engine operation with higher heat released from the DPF 13 (quantity of the negative heat transfer between the DPF 13 and exhaust emission), and the second engine operation is an operation with lower heating value in the DPF 13 (heat quantity by an oxidation reaction arising from burning particulate accumulating in the DPF 13) depending on the conditions of the DPF 13.

The first engine operation uses a lower exhaust temperature entering the DPF 13 and a high oxygen surplus (lean operation); and the second engine operation is an operation with higher exhaust temperature entering the DPF 13 and a low oxygen surplus (rich operation). Both operations can be carried out by control unit 20 by controlling the fuel injection amount and fuel injection timing, opening into the inlet air throttle 5, opening the EGR valve 12, and nozzle-opening into a variable-nozzle mechanism 15 of the supercharger 3.

The conditions of the DPF 13 can be determined with precision by determining based on the temperature of the DPF 13 and particulate sediment in the DPF 13. The conditions of the DPF 13 can be determined with precision by calculating the heat quantity by an oxidation reaction arising from burning particulate accumulating in the DPF 13, and the quantity of the negative heat transfer between the DPF 13 and exhaust emission in the case of the first and the second engine operations respectively based on the temperature of the DPF 13 and particulate sediment in the DPF 13.

These calculations produce the heat budgets of the first and second engine operations. The temperature of the DPF 13 can be lowered by comparing the heat budget of the first engine operation, and the heat budget of the second engine operation, and by selecting the operation with the lowest heat budget.

The heat quantity by an oxidation reaction arising from burning particulate accumulating in the DPF 13 can be predicted with precision by predicting the temperature of the DPF 13 (Tdpf), particulate sediment in the DPF 13 (C), and the oxygen concentration of the exhaust emission entering the DPF (O).

The quantity of the negative heat transfer between the DPF 13 and exhaust emission can be predicted with precision by predicting the temperature of the DPF 13 (Tdpf), temperature of the exhaust emission entering the DPF (Tgas), and the flow rate of the exhaust emission entering the DPF 13 (SV).

The temperature of the DPF 13 (Tdpf) can be predicted with precision by measuring the exhaust temperature detected by the exhaust temperature sensors 26,27 provided on both the filter inlet and the filter outlet sides.

The particulate sediment in the DPF 13 (C) can be predicted with precision by measuring the differential pressure in the DPF 13 ΔP, and the flow rate of the exhaust emission entering the DPF 13 (SV).

The oxygen concentration of the exhaust emission entering the DPF (O) can be easily reduced to practice by determining based on type of operations, the first and the second respectively.

The temperature of the exhaust emission entering the DPF (Tgas) can be easily determined by determining based on type of operations, the first and the second respectively.

The flow rate of the exhaust emission entering the DPF 13 (SV) can be predicted by predicting the detected value of an air flow meter 21 provided in an engine inlet system, and the reading of the injection quantity Qf to a fuel injection valve 9.

Various embodiments of the invention have been described. These and other embodiments are within the scope of the following claims.

The invention claimed is:

1. An internal combustion engine comprising:
   a filter in an exhaust path of the internal combustion engine that captures particulates from exhaust in the exhaust path;
   an inlet air throttle in an intake air path of the internal combustion engine that controls intake air amount;
   a fuel injection that sprays fuel to supply to the internal combustion engine; and
   a control unit that determines a regeneration condition when an amount of particulate sediment is greater than a predetermined value, controls the intake air amount and a fuel injection amount with control signals when the regeneration condition is determined, determines when regeneration conditions deviate from prescribed regeneration conditions during regeneration of the filter, estimates a trend of a temperature of the filter for a change in an engine operation mode to a first engine operation or a second engine operation, wherein the first engine operation provides a first air/fuel ratio, and the second engine operation provides a second air/fuel ratio that is richer than the first air/fuel ratio, and, when the regeneration conditions deviate, selects one of the first engine operation and the second engine operation where the temperature of the filter falls further based on the trend.

2. The internal combustion engine of claim 1,
   wherein the first engine operation provides a first exhaust temperature and a first oxygen surplus, and the second engine operation provides a second exhaust temperature and a second oxygen surplus, and
   wherein the first exhaust temperature is lower than the second exhaust temperature, and the first oxygen surplus is higher than the second oxygen surplus.

3. The internal combustion engine of claim 1, wherein the control unit selects one of the first engine operation and the second engine operation as a function of a temperature of the filter and an amount of particulate sediment in the filter.

4. An internal combustion engine comprising:
   a filter in an exhaust path of the internal combustion engine that captures particulates from exhaust in the exhaust path;
   an inlet air throttle in an intake air path of the internal combustion engine that controls intake air amount;
   a fuel injection that sprays fuel to supply to the internal combustion engine; and
   a control unit that determines a regeneration condition when an amount of particulate sediment is greater than a predetermined value, controls the intake air amount and a fuel injection amount with control signals when the regeneration condition is determined, determines when regeneration conditions deviate from prescribed regeneration conditions during regeneration of the filter and selects one of:
      a first engine operation that increases heat transfer from the filter to the exhaust, and
      a second engine operation that limits particulate combustion in the filter wherein the control unit selects one of the first engine operation and the second engine operation as a function of a first heat budget corresponding to the first engine operation and a second heat budget corresponding to the second engine operation,
   wherein the first heat budget includes a first heat quantity from a first oxidation reaction of burning accumulated particulates in the filter and a first quantity of negative heat transfer between the filter and the exhaust, and
   wherein the second heat budget includes a second heat quantity from a second oxidation reaction of burning accumulated particulates in the filter and a second quantity of negative heat transfer between the filter and the exhaust.

5. The internal combustion engine of claim 4, wherein the control unit selects one of the first engine operation and the second engine operation by comparing the first heat budget and the second heat budget and selecting the operation with the lowest corresponding heat budget.

6. The internal combustion engine of claim 4, wherein the control unit calculates the first heat quantity using a temperature of the filter, an amount of particulate sediment in the filter, and an oxygen concentration in the exhaust entering the filter as inputs.

7. The internal combustion engine of claim 6, wherein the control unit calculates the temperature of the filter using inputs from a first exhaust temperature sensor at an inlet side of the filter and a second exhaust temperature sensor at an outlet side of the filter.

8. The internal combustion engine of claim 6, wherein the control unit calculates the amount of particulate sediment in the filter using a differential pressure of the filter, and a flow rate of the exhaust as inputs.

9. The internal combustion engine of claim 6, wherein the control unit calculates the oxygen concentration according to operation of the internal combustion engine under the first engine operation.

10. The internal combustion engine of claim 4, wherein the control unit calculates the first quantity of negative heat transfer using a temperature of the filter, an exhaust temperature entering the filter, and a flow rate of the exhaust as inputs.

11. The internal combustion engine of claim 10, wherein the control unit calculates the exhaust temperature according to operation of the internal combustion engine under the first engine operation.

12. The internal combustion engine of claim 10, wherein the control unit calculates the flow rate using air flow measured by an air flow meter in an engine inlet system, and an injection quantity measured at a fuel injection value.

13. A method comprising:
determining if an engine driving mode changes to one of an idle drive, slow-speed drive or ultra-low-speed drive during regeneration of an exhaust particulate filter;
estimating a trend of a temperature of the exhaust particulate filter for a change of an engine operation mode to a first engine operation mode or a second engine operation mode, wherein the first engine operation mode provides a first air/fuel ratio, and the second engine operation mode provides a second air/fuel ratio that is richer than the first air/fuel ratio; and
in response to determining the engine driving mode changes to the one of the idle drive, slow-speed drive or ultra-low-speed drive during regeneration of an exhaust particulate filter, selecting one of the first engine operation mode and the second engine operation mode where the temperature of the filter falls further based on the trend.

14. The method of claim 13,
wherein the first engine operation provides a first exhaust temperature and a first oxygen surplus, and the second engine operation provides a second exhaust temperature and a second oxygen surplus,
wherein the first exhaust temperature is lower than the second exhaust temperature, and the first oxygen surplus is higher than the second oxygen surplus.

15. The method of claim 13, further comprising:
determining a temperature of the filter; and
determining an amount of particulate sediment in the filter, wherein the selection of one of the first engine operation and the second engine operation is dependant on the temperature of the filter and the amount of particulate sediment in the filter.

16. A method comprising:
determining whether regeneration conditions deviate from prescribed regeneration conditions during regeneration of an exhaust particulate filter;
in response to the determination, selecting one of:
a first engine operation that increases heat transfer from the filter to exhaust passing through the filter, and
a second engine operation that limits particulate combustion in the filter;
calculating a first heat budget including a first heat quantity from a first oxidation reaction of burning accumulated particulates in the filter and a first quantity of negative heat transfer between the filter and the exhaust corresponding to the first engine operation; and
calculating a second heat budget including a second heat quantity from a second oxidation reaction of burning accumulated particulates in the filter and a second quantity of negative heat transfer between the filter and the exhaust corresponding to the second engine operation,
wherein the selection of one of the first engine operation and the second engine operation is dependant on the first heat budget and the second heat budget.

17. The method of claim 16, further comprising:
comparing the first heat budget and the second heat budget; and
selecting the operation with the lowest corresponding heat budget.

18. The method of claim 16, further comprising calculating the first heat quantity using a temperature of the filter, an amount of particulate sediment in the filter, and an oxygen concentration in the exhaust entering the filter as inputs.

19. The method of claim 16, further comprising calculating the first quantity of negative heat transfer using a temperature of the filter, an exhaust temperature entering the filter, and a flow rate of the exhaust as inputs.

* * * * *